United States Patent
Okazaki et al.

[11] Patent Number: 5,193,888
[45] Date of Patent: Mar. 16, 1993

[54] SLIP CONTROL SYSTEM FOR MOTOR VEHICLE

[75] Inventors: Haruki Okazaki; Toru Onaka; Kazutoshi Nobumoto; Fumio Kageyama; Makoto Kawamura, all of Hiroshima, Japan

[73] Assignee: Mazda Motor Corporation, Hiroshima, Japan

[21] Appl. No.: 658,753

[22] Filed: Feb. 21, 1991

[30] Foreign Application Priority Data

Feb. 22, 1990 [JP] Japan .................................. 2-41552

[51] Int. Cl.$^5$ .............................................. B60T 8/58
[52] U.S. Cl. .................................... 303/93; 180/197; 303/100
[58] Field of Search ........................ 303/93, 113 TR; 180/197

[56] References Cited

U.S. PATENT DOCUMENTS

| | | | |
|---|---|---|---|
| 4,778,223 | 10/1988 | Inoue | 303/93 X |
| 4,807,944 | 2/1989 | Weise | 303/93 X |
| 4,818,038 | 4/1989 | Ocvirk et al. | 303/113 TR |
| 4,838,620 | 6/1989 | Sypniewski | 303/113 TR X |
| 4,846,532 | 7/1989 | Friedow et al. | 303/113 TR |
| 4,878,715 | 11/1989 | Toda | 303/113 TR |
| 4,900,105 | 2/1990 | Burgdorf et al. | 303/113 TR X |
| 4,944,565 | 7/1990 | Gilbert | 303/113 TR |
| 4,950,038 | 8/1990 | Ocvirk et al. | 303/113 TR |
| 4,971,400 | 11/1990 | Jonner | 303/113 TR |

Primary Examiner—Margaret A. Focarino
Assistant Examiner—Carla Mattix
Attorney, Agent, or Firm—Keck, Mahin & Cate

[57] ABSTRACT

A slip control system for a motor vehicle controls slippage of driving wheels and includes, a sensor for detecting a slip ratio of each driving wheel, a device for detecting a reduction in speed of each wheel, and a traction control system for decreasing a slip of each driving wheel by controlling brake fluid pressure in each driving wheel so that the slip ratio of each driving wheel is at least equal to a predetermined desired slip ratio when the slip ratio of each driving wheel becomes equal to the desired slip ratio. The system further includes an antiskid brake system for controlling brake fluid pressure, based on the reduction speed of each wheel, so as to cancel a lock condition of the wheel. The antiskid brake system has a first control device for controlling the brake pressure fluid in a condition in which a traction control operation is not carried out by the traction control system, and a second control device for controlling the brake pressure fluid in a condition in which a traction control operation is carried out by the traction control system.

9 Claims, 6 Drawing Sheets

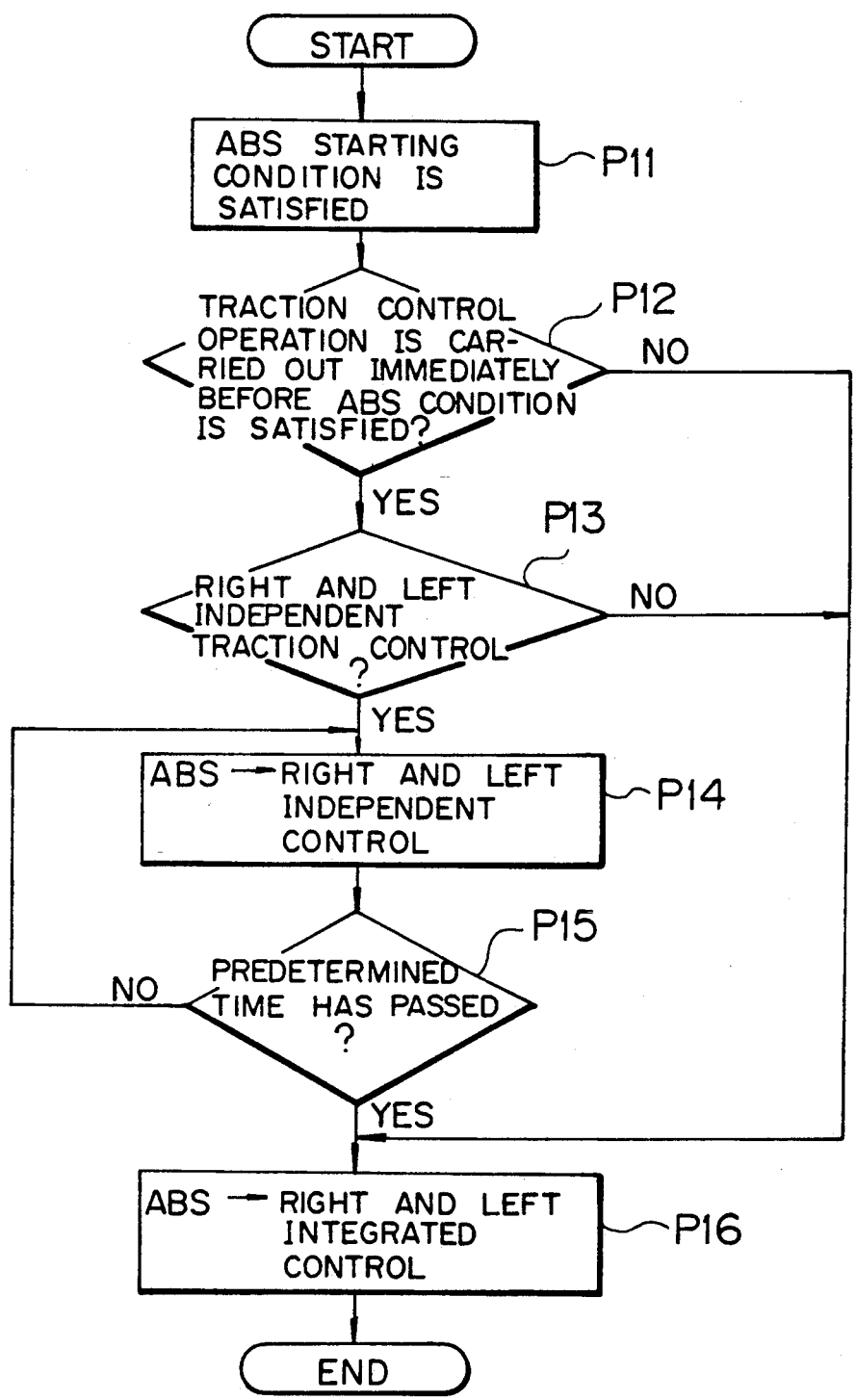

SLIP CONTROL SYSTEM FOR MOTOR VEHICLE

BACKGROUND OF THE INVENTION

1. Field of the Invention

The present invention relates to a slip control system for a motor vehicle and, in particular, to a slip control system which includes a traction control system and an antiskid brake system.

2. Description of Related Art

There have been proposed slip control systems with a traction control system for a motor vehicle, Such is shown in Japanese Laid-Open Patent Publication No. 58-16948, No. 57-22948, No. 62-231836, and the like. When an excessive slip is caused between driving wheels and road surfaces during starting and/or running operations, the slip control system decreases the excessive slip to under a predetermined value to obtain driving forces which are transmitted to the road surface from the driving wheels. Therefore, starting or accelerating ability is improved.

When the vehicle is running on a low friction coefficient road surface, an excessive depression of the acceleration pedal causes an excessive slip in the driving wheels. At this time, the traction control system decreases the driving torque transmitted to the driving wheels by increasing the brake fluid pressure in the driving wheels and increasing the brake force on the driving wheels. As a result, the vehicle decreases the excessive slip and obtains a desired friction coefficient between the driving wheels and the road surface.

The slip control system is provided with an antiskid brake system (hereinafter called "ABS") which maintains a desired friction coefficient between the driving wheels and the road surface and obtains an optimal brake force in the braking operation by controlling the brake fluid pressure in the driving wheels based on the skid condition in the wheels. The ABS detects the skid condition of the respective wheels based on the estimated vehicle speed computed by using the reduction speed of the vehicle and the wheel rotation speed of the respective wheel and then, based on the skid condition, decreases the brake fluid pressure so as to cancel the lock condition of the wheels in the braking condition. Consequently, the vehicle obtains a desired friction coefficient between the driving wheels and the road surface.

In a conventional slip control system including both the traction control system and the ABS, for the safety of passengers, brake control by the ABS is given priority over the brake control by the traction control system. There is a possibility that the ABS will mistake the reduction speed of the driving wheel caused when the traction control system is controlling the slip of the driving wheel for the reduction speed of the wheel caused by the skid condition of the wheel. Consequently, the brake fluid pressure which should be maintained in the increased pressure condition is, to the contrary, decreased.

Moreover, the ABS employs a right and left independent control in the front wheels by which the ABS controls the brake fluid pressure in the right and left front wheels independently. The ABS also employs a right and left integrated control in the rear wheels to stabilize the vehicle, by which the ABS controls the brake fluid pressure in the right and left rear wheels, based on the reduction speed of a rear wheel which contacts a road surface having a friction coefficient which is relatively small as compared to that of another road surface or the average of the reduction speed of the rear wheels.

On the other hand, the traction control system employs a right and left independent control in the driving wheels by which the system controls the brake fluid pressure in the right and left driving wheels independently so as to maintain the driving torque in the driving wheel with no slip and improve drivability.

Therefore, when the brake fluid pressure in the rear or driving wheels starts to be decreased by the ABS immediately after the traction control system increases the brake fluid pressure in the rear or driving wheels, the ABS decreases the brake fluid pressure in the right and left rear wheels equally based on the rear wheel contacting the road surface having a friction coefficient which is relatively small as compared to that of another road surface or the rear wheel having a brake fluid pressure which is increased higher than that of the other rear wheel by the traction control system. Consequently, there is a possibility that the brake fluid pressure in the rear wheel having a brake fluid pressure which is not increased higher than that of the other rear wheel will be increased too much.

SUMMARY OF THE INVENTION

It is, therefore, an object of the invention to provide a slip control system for a motor vehicle which is able to operate cooperatively a traction control system and an ABS advantageously.

It is another object of the invention to provide a slip control system for a motor vehicle in which an ABS is able to detect a skid condition of the wheels advantageously.

It is a further object of the invention to provide a slip control system for a motor vehicle which is able to decrease brake fluid pressure of a driving wheel down to a desired value when an ABS is operated immediately after a traction control operation is carried out by a traction control system.

According to the present invention, there is provided a slip control system for a motor vehicle, controlling slippage of driving wheels, including means for detecting a slip ratio of each driving wheel, means for detecting a reduction speed of each wheel, traction control means for decreasing a slip of each driving wheel by controlling brake fluid pressure in each driving wheel so that the slip ratio of each driving wheel is at least equal to a predetermined desired slip ratio and the slip ratio of each driving wheel becomes more than the desired slip ratio, and an antiskid brake system for controlling brake fluid pressure based on the reduction speed of each wheel so as to cancel a lock condition of the wheel. The antiskid brake system includes first control means for controlling the brake pressure fluid in a condition in which a traction control operation is not carried out by the traction control means, and second control means for controlling the brake pressure fluid in a condition in which a traction control operation is carried out by the traction control means.

In a preferred embodiment of the invention, the first control means includes brake control means for controlling the brake fluid pressure based on a skid condition of the wheel which is determined based on the reduction speed detected by the reduction speed detecting means. Also the second control means includes brake control means for controlling the brake fluid pressure based on a skid condition of the wheel which is determined based on the slip ratio detected by the slip ratio detecting means.

In another embodiment of the invention, the first control means includes brake control means for decreasing the brake fluid pressure in the driving wheels equally based on a skid condition of the driving wheels. The second control means includes brake control means for decreasing the brake fluid pressure in the driving wheels independently based on a skid condition of each driving wheel.

The above and other objects and features of the present invention will be apparent from the following description and by making reference to the accompanying drawings showing preferred embodiments of the present invention.

BRIEF DESCRIPTION OF THE DRAWINGS

FIG. 6 is a flow chart showing a procedure of controlling the rear wheels by the antiskid brake control system.

DESCRIPTION OF THE PREFERRED EMBODIMENT

Figure 1:
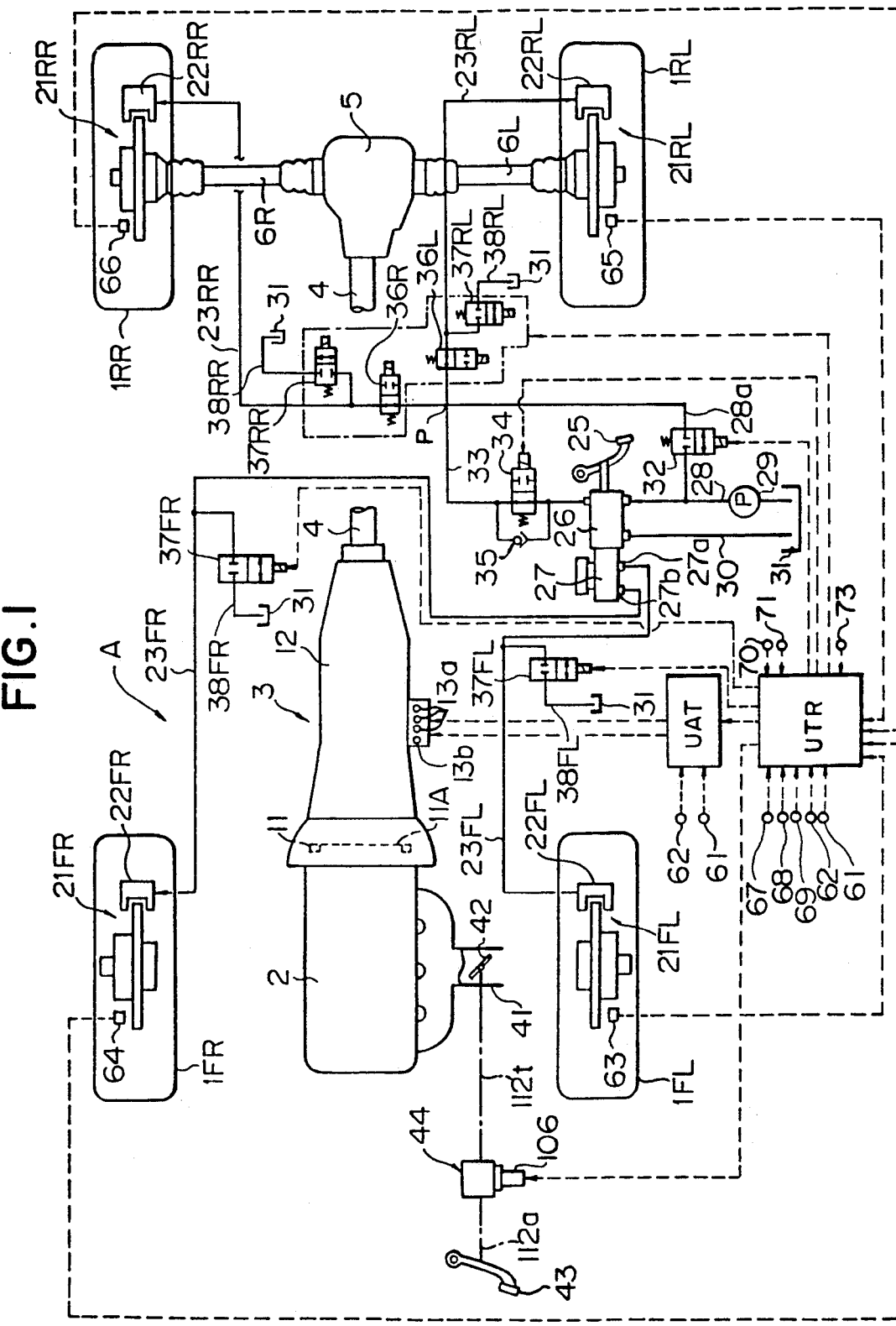
FIG. 1 is a general diagram of a slip control system in accordance with the present invention.

Referring to FIG. 1, there is shown a motor vehicle A having a slip control system in accordance with one embodiment of the present invention. The vehicle A has right and left front wheels 1FR, 1FL for driven wheels, and right and left rear wheels 1RR, 1RL for driving wheels.

A driving system includes an engine 2 disposed in the front portion of the vehicle, an automatic transmission 3 connected directly to a crankshaft of the engine 2, a propeller shaft 4 connected to an outputshaft of the automatic transmission 3, a differential 5 connected to the rear end portion of the propeller shaft 4, and driving shafts 6R, 6L extending from the differential 5 in right and left directions, respectively, and connected to the right rear wheel 1RR and the left rear wheel 1RL, respectively.

A throttle valve 42 is provided in an intake path 41 of the engine 2 to control the amount of the intake air. The throttle valve 42 is connected to an acceleration pedal 43 through a throttle opening control mechanism 44 and an acceleration wire 112a. The throttle opening control mechanism 44 includes a motor 106. The throttle opening control mechanism 44 works in such a way that the throttle opening is made to correspond to the accelerator opening at a ratio of 1:1; the depression amount of the acceleration pedal 43 is transmitted directly to the throttle valve 42 in the non-working condition of the motor 106. The ratio of the throttle opening to the accelerator opening is controlled in the range from 1:1 to 0:1 by the depression amount of the acceleration pedal 43 being reduced in accordance with the normal direction of rotation, the reverse direction rotation, or maintaining of the rotation of the motor 106 and then being transmitted to the throttle valve 42 in the working condition of the motor 106. Specifically, in the non-working condition of the motor 106, when the acceleration pedal 43 is provided with the accelerator opening A%, the throttle opening control mechanism 44 transmits the accelerator opening A% directly to the throttle valve 42 and operates the throttle valve 42 so that the valve 42 has the throttle opening A%. On the other hand, in the working condition of the motor 106, when the acceleration pedal 43 is provided with the accelerator opening A%, the throttle opening control mechanism 44 can change the throttle opening in the range from A% to 0% by the normal direction rotation or the reverse direction rotation of the motor 106, and can further maintain the throttle opening by maintaining of the rotation of the motor 106.

The automatic transmission 3 comprises a torque converter 11 with a lockup clutch 11A operated by hydraulic pressure and a transmission 12 with a multiple-stage transmission gear mechanism. The transmission control operation is carried out by selecting combinations of magnetization and/or demagnetization of a plurality of solenoids 13a which are incorporated in a hydraulic control circuit for the automatic transmission 3. Connection and disconnection of the lockup clutch 11A is carried out by selecting magnetization or demagnetization of a solenoid 13b which is incorporated in the hydraulic control circuit.

The motor vehicle A includes a brake system. The brake system includes brakes 21FR, 21FL, 21RR, 21RL provided respectively in wheels 1FR, 1FL, 1RR, 1RL, a tandem type master cylinder 27 connected to respective calipers (or brake cylinders thereof) 22FR, 22FL of the front wheel brakes 21FR, 21FL through respective brake conduits 23FR, 23FL, a hydraulic booster 26 connected to respective calipers 22RR, 22RL of the rear wheel brakes 21RR, 21RL through respective brake conduits 23RR, 23RL, and a brake pedal 25.

The master cylinder 27 supplies predetermined brake fluid pressure to the front wheels 1FR, 1FL. The master cylinder 27 changes the braking force which is applied to the brake pedal 25 and boosted by the booster 26 into the brake fluid pressure and then supplies the brake fluid pressure to the calipers 22FR, 22FL through brake conduits 23FR, 23FL connected, respectively, to first discharge outlet 27a and second discharge outlet 27a.

The brake conduits 23FR, 23FL include relief conduits 38FR, 38FL, respectively, having ends communicating with a reservoir 31. The relief conduits 38FR, 38FL include normally closed type magnetic proportional switching valves 37FR, 37FL which work as outlet valves of an antiskid brake system (ABS). FIG. 1 shows the condition in which the switching valves 37FR, 37FL are switched to the closing positions.

The booster 26 boosts the braking force of the brake pedal 25 and transmits it to the master cylinder 27, and supplies brake fluid pressure in a booster chamber (not shown) to the calipers 22RR, 22RL through respective brake conduits 23RR, 23RL to which an accumulator (not shown) is connected. A pump 29 is connected to the booster 26 through a fluid pressure supply conduit 28. The pump 29 supplies the fluid in a reservoir 31 at a predetermined pressure to the conduit 28, which is maintained at a predetermined line pressure by the accumulator. A return conduit 30 is connected to the booster 26 so as to return the fluid from the booster 26 to the reservoir 31.

The booster chamber of the booster 26 is connected to a brake conduit 33 in which a normal opened type magnetic switching valve 34 is provided and a one way valve 35 is provided in parallel to the switching valve 34. FIG. 1 shows the condition that the switching valve 34 is switched to the full-opened position.

The brake conduit 33 branches into brake conduits 23RR, 23RL for the rear wheels 1RR, 1RL at a junction point P. A normal opened type magnetic proportional switching valve 36R is provided in the brake conduit 23RR and a normal opened type magnetic proportional switching valve 36L is provided in the brake conduit 23RL. The brake conduits 23RR, 23RL are provided, respectively, with relief conduits 38RR, 38RL which are branched on the down stream portion of the switching valves 36R, 36L and communicate with the reservoir 31, respectively. The relief conduits 38RR, 38RL are provided with normal closed type magnetic proportional switching valves 37RR, 37RL, respectively, which work as outlet valves of the ABS. FIG. 1 shows the condition in which the switching valves 37RR, 37RL are switched, respectively, to the full-closed positions.

At the junction point P, there is provided a branch conduit 28a communicating to the conduit 28. The branch conduit 28a is provided with a normal closed type switching valve 32. FIG. 1 shows the condition that the switching valve 32 is switched to the full-closed position.

The motor vehicle A further includes a control unit UAT for the automatic transmission 3, a slip control unit UTR which includes an antiskid brake control system (hereinafter called ABS control system) and a traction control system. The solenoids 13a, 13b are controlled by the control unit UAT for the automatic transmission 3. When the brakes are operated, the ABS control system maintains desired friction force between each wheel 1FR, 1FL, 1RR, 1RL and the road surface to obtain the optimal braking force for the vehicle. When excessive slip is caused in the rear wheels 1RR, 1RL when the vehicle is being run or started, the traction control system decreases the amount of excessive slip so as to obtain the desired driving force of the rear wheels 1RR, 1RL.

The control unit UAT receives detected signals from sensors 61, 62 in which the sensor 61 detects the opening of the throttle valve 42 and the sensor 62 detects the vehicle speed based on the rotation number of the propeller shaft 4. In accordance with these signals and stored transmission and lockup characteristics, the control unit UAT determines the transmission and lockup conditions, and then outputs the control signals to the solenoids 13a, 13b of the automatic transmission 3 to carry out the transmission and lockup controls.

To the slip control unit UTR are input various kinds of signals which are detected, respectively, by the throttle sensor 61, the vehicle speed sensor 62, wheel rotation speed sensors 63, 64, 65, 66 for detecting the wheel rotation speed of each wheel 1FR, 1FL, 1RR, 1RL, an acceleration opening sensor 67 for detecting the depression amount of the pedal 43, a motor rotation amount sensor 68 for detecting the rotation amount of the motor 106, a steering sensor 69 for detecting the angular steering amount of a steering wheel (not shown), a manual switch 70 for selecting control modes, a brake switch 71 for detecting the depression of the pedal 25, and a G sensor 73 for detecting a reduction speed of the vehicle.

The control unit UTR further includes an input interface for receiving the signals from the abovementioned sensors, a microcomputer comprising a ROM in which control programs and various kinds of control maps and the like are stored, a RAM in which various kinds of memories necessary for carrying out the control are stored, a CPU, an output interface for outputing control signals to the control unit UAT, and control circuits for operating the valves 32, 34, 36R, 36L, 37FR, 37FL, 37RR, 37RL and the motor 106.

In the control unit UTR, the ABS control system detects skid conditions of each wheel 1FR, 1FL, 1RR, 1RL based on the difference between an estimated vehicle speed and the wheel rotation speed of each wheel detected respectively by each sensor 63, 64, 65, 66. The estimated vehicle speed is computed based on the reduction speed of the vehicle detected by the G sensor 73. When the ABS control system determines that any one of the wheels 1FR, 1FL, 1RR, 1RL is in the lock condition, the system controls the openings of the switching valves 37FR, 37FL, 37RR, 37RL and decreases the line fluid pressure in the brake conduit(s) 23FR, 23FL, 23RR, 23RL each wheel of which is determined to be in the lock condition so as to cancel the lock condition.

The ABS control system controls each of the front wheels 1FR, 1FL independently. For example, in the braking operation, the ABS control system detects the excessive reduction speed only in the front wheel 1FL and then carries out a duty control on the switching valve 37FL so as to increase the opening of the switching valve 37FL so that the line pressure in the brake conduit 23FL and the fluid pressure in the brake cylinder of the caliper 22FL is decreased. Then, the brake fluid pressure in the brake 21FL is decreased transitionally. The skid in the front wheel 1FL is controlled so that the front wheel 1FL is able to obtain desired friction force against the road surface and an optimal braking force.

On the other hand, the ABS control system controls each of the rear wheels equally. For example, in the braking operation, the ABS control system detects the excessive reduction speed only in the rear wheel 1RL and then carries out a duty control equally on each of the switching valves 37RR, 37RL by using a command based on the reduction speed in the rear wheel 1RL so as to increase the openings of the switching valves 37RR, 37RL so that the line pressure in the brake conduits 23RR, 23RL and the fluid pressure in the brake cylinder of the calipers 22RR, 22RL is decreased. Then, the brake fluid pressure in the brake 21FL is decreased transitionally. The skid in the rear wheel 1RL is controlled so that the rear wheel 1RL is able to obtain desired friction force against the road surface and an optimal braking force. Further, the vehicle can obtain safety for passengers as there is no movement causing a yawing motion.

In the control unit UTR, the traction control system carries out an engine control and a brake control. The engine control is carried out by controlling the rotation amount of the motor 106 in the throttle opening control mechanism 44 to decrease the output of the engine 2 transitionally when the excessive slip is caused in the driving wheels (the rear wheels 1RR, 1RL) at the time the vehicle is being started or running. The brake control is carried Out by controlling the valves 32, 34 in open and closed positions and controlling the degree of opening of the valves 36R, 36L, 37RR, 37RL so as to control the value of the brake fluid pressure. By the engine control operation and the brake control operation, driving torques transmitted to the rear wheels 1RR, 1RL are decreased and the slips in the rear wheels 1RR, 1RL are controlled.

In the engine control operation, the throttle opening control mechanism 44 decreases the degree of the opening of the throttle valve 42 less than the acceleration opening of the pedal 43 to decrease the output of the engine 2.

In the brake control operation, by the switching valve 34 being switched to the full-closed position and the switching valve 32 being switched to the full-opened position, the fluid pressure supply conduit 28 increases the line pressure in the brake conduits 23RR, 23RL. Then, the line pressure is maintained by the switching valves 36R, 36L being switched to the closed position, or the line pressure is released by the switching valves 37RR, 37RL being switched to the open position.

Figure 2:
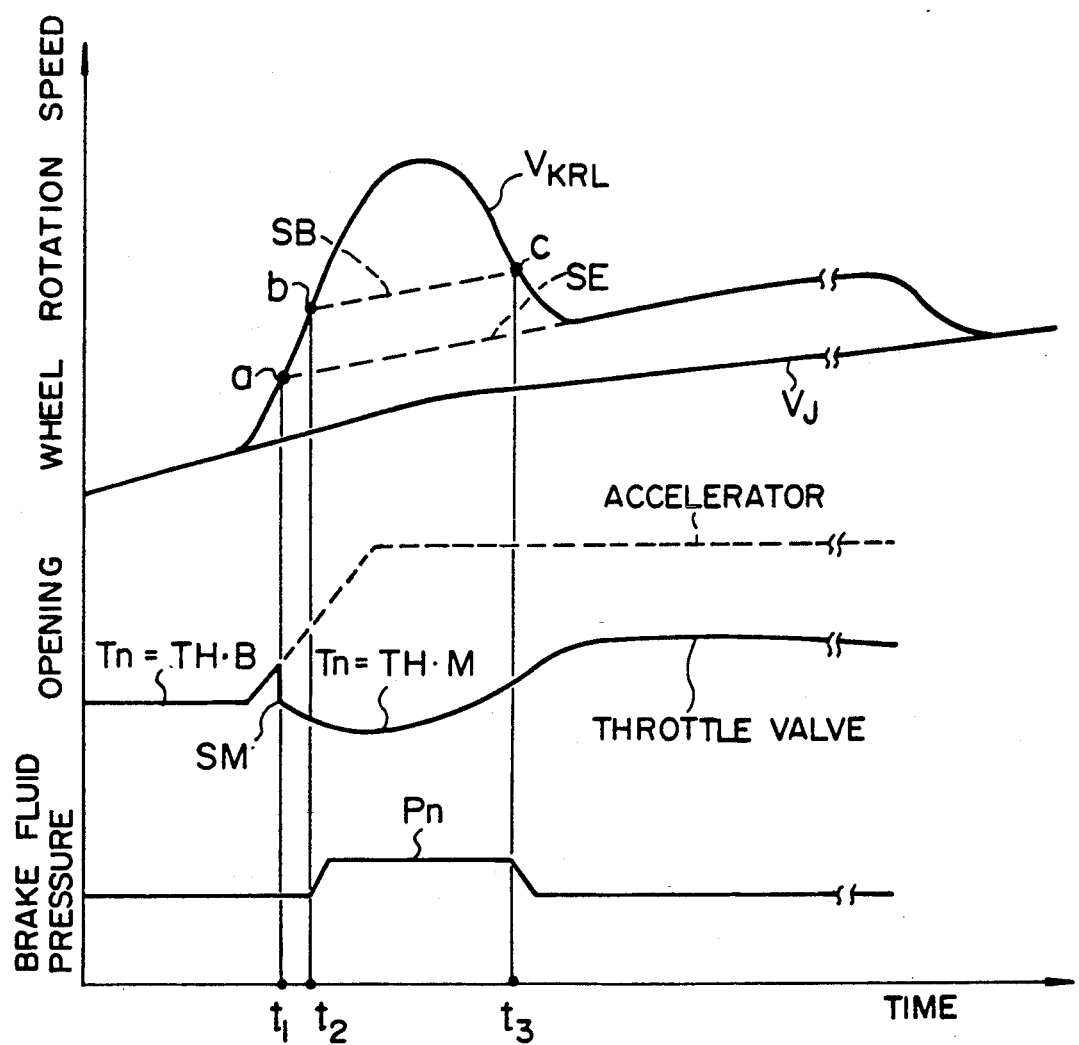
FIG. 2 is a time chart showing an outline of the slip control.
Figure 3:
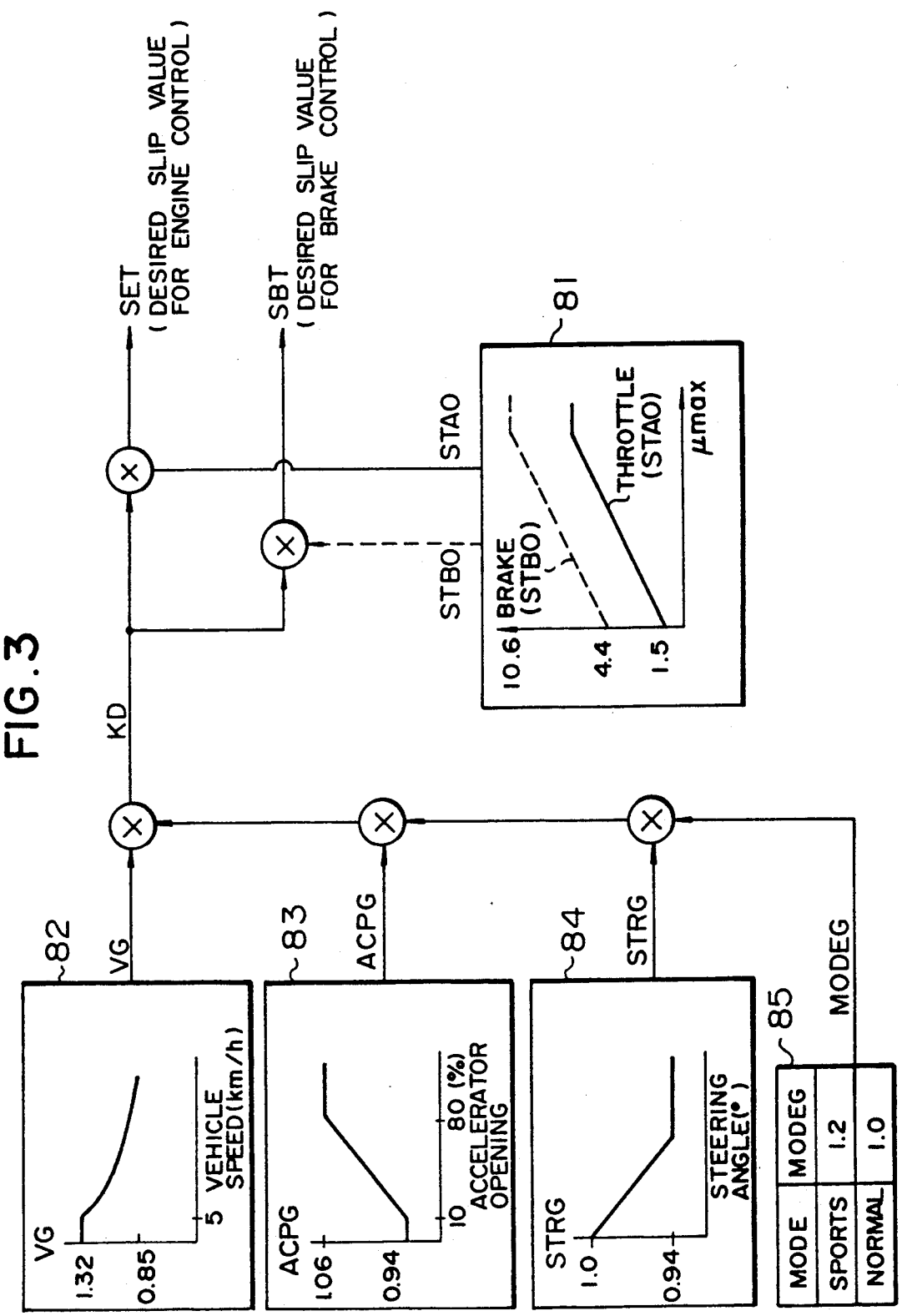
FIG. 3 is a block diagram showing a circuit which determines a desired slip value for the brake control operation and a desired slip value for the engine control operation to set both desired slip values of the rear wheels.
Figure 4:
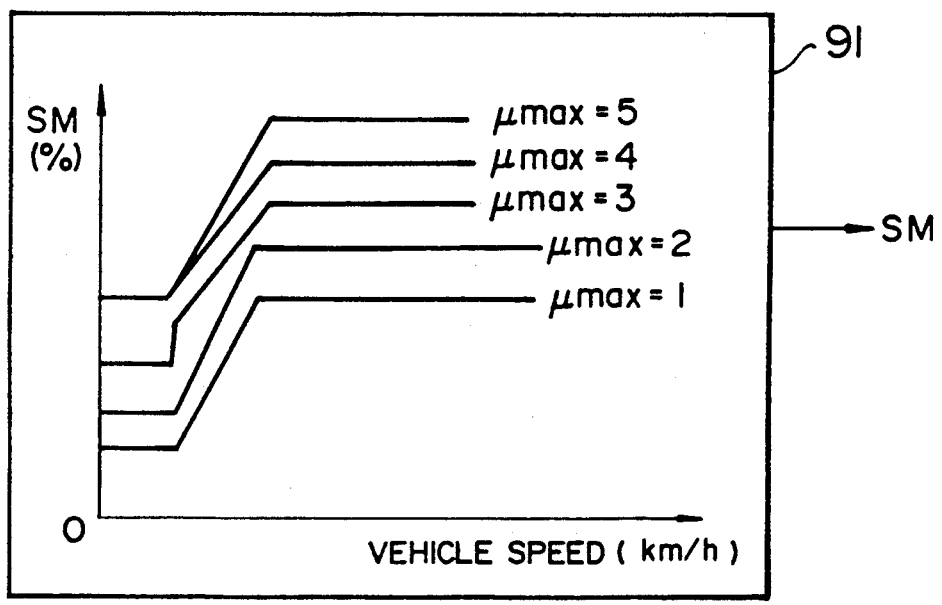
FIG. 4 is a diagram showing the lower limit of the throttle opening determined by the traction control system.

FIG. 2 is a time chart which shows a relationship between the general vehicle wheel rotation characteristic of the rear wheels in the traction control operation, and the engine control operation and brake control operation by the traction control system. FIG. 3 is a block diagram showing a circuit determining a desired slip value for the brake control operation and a desired slip value for the engine control operation to set both desired slip values of the driving wheels. FIG. 4 is a diagram showing the lower limit of the throttle opening determined by the traction control system.

FIG. 2 shows the general vehicle wheel rotation characteristic of the driving wheel, for example, the rear left wheel 1RL, in the traction control operation. The other driving wheel or rear right wheel 1RR has substantialy the same characteristic as the rear left wheel 1RL.

In FIG. 2, $V_{KRL}$ shows the wheel rotation speed of the driving wheel or the rear left wheel 1RL in the traction control operation, and $V_J$ shows the wheel rotation speed of the driven wheel or the average value of the front wheels 1FR, 1FL. A threshold a and a threshold b are shown. The threshold a corresponds to a basic desired slip ratio SE employed in the engine control operation which controls the slip ratio of the rear wheel 1RL by controlling the opening of the throttle valve. The threshold b corresponds to a basic desired slip ratio SB employed in the brake control operation which controls the slip ratio of the rear wheel 1RL by controlling the pressure of the brake fluid. The threshold b is set as a larger value than the threshold a.

The slip ratio $S_{RL}$ of the rear wheel 1RL is calculated as follows:

$$\text{Slip Ratio } S_{RL} = \frac{V_{KRL} - V_J}{V_{KRL}}$$

The basic desired slip ratios SE, SB are calculated, respectively, as follows:

$$SE = \frac{SET}{V_J}$$

$$SB = \frac{SBT}{V_J}$$

where SET and SBT show respectivly a desired slip value for the engine control operation and a desired slip value for the brake control operation, both of which are set in the rear wheels 1RL, 1RR equally.

The desired slip value SET for the engine control operation and the desired slip value SBT for the brake control operation are set so that the rear wheels 1RL, 1RR obtain the predtermined driving force mainly when the vehicle is running straight. Specifically, the desired slip values SET and SBT are determined based on parameters such as the maximum friction coefficient $\mu$max of the road surface, the vehicle speed, the accelerator opening, the steering angle, and the running mode selected by the mode selecting switch 70 as shown in FIG. 3.

As shown in FIG. 3, the control unit UTR has a map where a basic value STBO of the desired slip value SBT and a basic value STAO of the desired slip value SET are respectively stored. Their parameter is a maximum friction coefficient $\mu$max of the road surface which is estimated based on the larger of the slip ratios $S_{RL}$ or $S_{RR}$ of the respective rear wheels and the driving wheel rotation speed $V_J$. In the map, the basic value STBO is set as a larger value than the basic value STAO. Abovementioned desired slip values SET and SBT are obtained, respectively, by multiplying the basic values STAO, STBO by a correction gain KD. The correction gain KD is obtained by multiplying a gain coefficient VG by gain coefficients ACPG, STRG, MODEG. The gain coefficient VG is provided so as to obtain stability of the vehicle in accordance with the increase of the vehicle speed and is given by a map 82 as a function of the vehicle speed. The gain coefficient ACPG is provided so as to obtain the driving force in accordance with the acceleration demand of the driver and is given by a map 83 as a function of the accelerator opening. The gain coefficient STRG is provided so as to obtain the stability of the vehicle in the steering operation and is given by a map 84 as a function of the steering angle. The gain coefficient MODEG is given by a table 85 and is manually selected from two modes, i.e. sports mode and normal mode by the driver.

Referring back to FIG. 2, before the time $t_1$, the slip is small so that the throttle opening Tn is controlled under the basic throttle opening TH·B which is proportional to the accelerator opening by the motor 106 of the throttle opening control mechanism 44 being maintained in the non working condition. At this time, the pressure of the brake fluid supplied to the brakes 21FR~21RL is decreased by switching valves 32, 34, 36R, 36L and 37FR~37RL being maintained at the normal positions respectively.

At the time $t_1$ when the driving wheel rotation speed $V_{KRL}$ increases to the threshold a of the basic desired slip ratio SE, the engine control operation by the slip control system is started. In the engine control operation, the traction control system in the slip control unit UTR carries out a feedforward control so as to drop the throttle opening to a lower limit control value SM by the motor 106 of the mechanism 44 being worked.

Referring to FIG. 4, the lower limit control value SM of the throttle opening is stored as a map, whose parameters are the vehicle speed and the maximum friction coefficient $\mu$max of the road surface, and is determined based on these parameters. The maximum friction coefficient $\mu$max varies from 1 to 5, where the smallest is equal to 1 and the largest is equal to 5. When the road surface has a relatively small maximum friction coefficient μmax, a relative large lower limit control value SM is provided so as to decrease the output of the engine 2 rapidly. Also, when the road surface has a relatively large maximum friction coefficient μmax, a relatively small lower limit control value SM is provided so as to prevent the vehicle from stalling due to overreduction of the output of the engine 2.

After the throttle opening is dropped to the lower limit control value SM, the traction control system carries out a feedback control of the opening of the throttle valve 42 so that the slip ratio $S_{RL}$ of the rear wheel 1RL becomes the desired slip ratio SE for the engine control operation. The feedback control is carried out by controlling the rotating directions of the motor 106 in the mechanism 44 so that the throttle opening is controlled under TH·M as shown in FIG. 2.

Referring back to FIG. 2, after the time $t_1$, the driving wheel rotation speed $V_{KRL}$ of the rear wheel 1RL is still increasing against the driven wheel rotation speed $V_J$, while the engine control is operated. At the time $t_2$, the driving wheel rotation speed $V_{KRL}$ increases to the threshold b of the basic desired slip ratio SB. At this time, the brake control operation of the traction control is started so that the slip ratio $S_{RL}$ of the rear wheel 1RL is equal to the basic desired slip ratio SB. Namely, in the brake control operation, the slip control unit UTR of the traction control system controls the switching valves 32, 34, 36RR, 36RL so that the brake fluid pressure of the brake 21RL of the rear wheel 1RL is increased to the pressure $Pn_{RL}$ and then the pressure $Pn_{RL}$ is maintained.

After the time $t_1$, both engine control and brake control are operated to decrease the slip of the rear wheel 1RL. When the driving wheel rotation speed $V_{KRL}$ is decreased under the threshold c of the basic desired slip ratio SB for the brake control at the time of $t_3$, the slip control unit UTR stops the brake control operation by opening the switching valve 37RL and decreasing the brake fluid pressure. Meanwhile, the engine control operation is still being carried out until there is no possibility that the slip ratio $S_{RL}$ increases or the acceleration opening is reduced to zero.

The wheel rotation characteristic of the rear left wheel 1RL is described above with reference to FIG. 2. The rear right wheel 1RR has the same wheel rotation characteristic at the time of the traction control operation as that of the rear left wheel 1RL described above and shown in FIG. 2.

The engine control operation is carried out equally in the rear right wheel 1RR and the rear left wheel 1RL. Therefore, when the slip of the rear right wheel 1RR or rear left wheel 1RL is increased at an early stage, the engine control operation is started when the slip ratio $S_{RR}$ or $S_{RL}$ of the wheel 1RR or 1RL or the average of the slip ratios $S_{RR}$ and $S_{RL}$ is equal to the desired slip ratio SE for the engine control. The brake control operation is carried out in the rear right wheel and rear left wheel independently. Therefore, in the brake operation, when the slip ratio of respective rear wheels 1RR, 1RL is equal to the desired slip ratio SB for the brake control, the brake fluid pressure to the rear wheel 1RR or 1RL is increased respectively so that the slip ratio $S_{RR}$ or $S_{RL}$ of the wheel 1RR or 1RL is decreased under the desired slip ratio, respectively. Further, in order to improve the stability of the vehicle, the brake control operation employs the right and left integrated control in the predetermined driving condition such as at an early stage in the starting condition.

In the abovementioned ABS control operation in the slip control system, in order to provide safety for the passengers when the vehicle is being run, the brake control by the ABS control system is given priority over the brake control by the traction control system. Further, in order for quick control, the brake fluid is controlled based on the reduction speed of the wheel. Therefore, when the traction control system controls the slips of the rear wheels 1RR, 1RL, the ABS control system may mistake the reduction speed of the rear wheels 1RR, 1RL caused by the decrease of the slip, which is, for example, shown in FIG. 2 as the reduction portion of the driving wheel rotation speed $V_{KRL}$, for the reduction speed of the wheel caused by the skidding of the wheel in the brake operation. Then the ABS control system determines the decrease of the brake fluid pressure to the rear wheels 1RR, 1RL.

In accordance with the embodiment of the invention, in order to prevent the abovementioned misoperation of the ABS control system, the way of determining the skid condition of the respective wheel is changed during the traction control operation.

Figure 5:
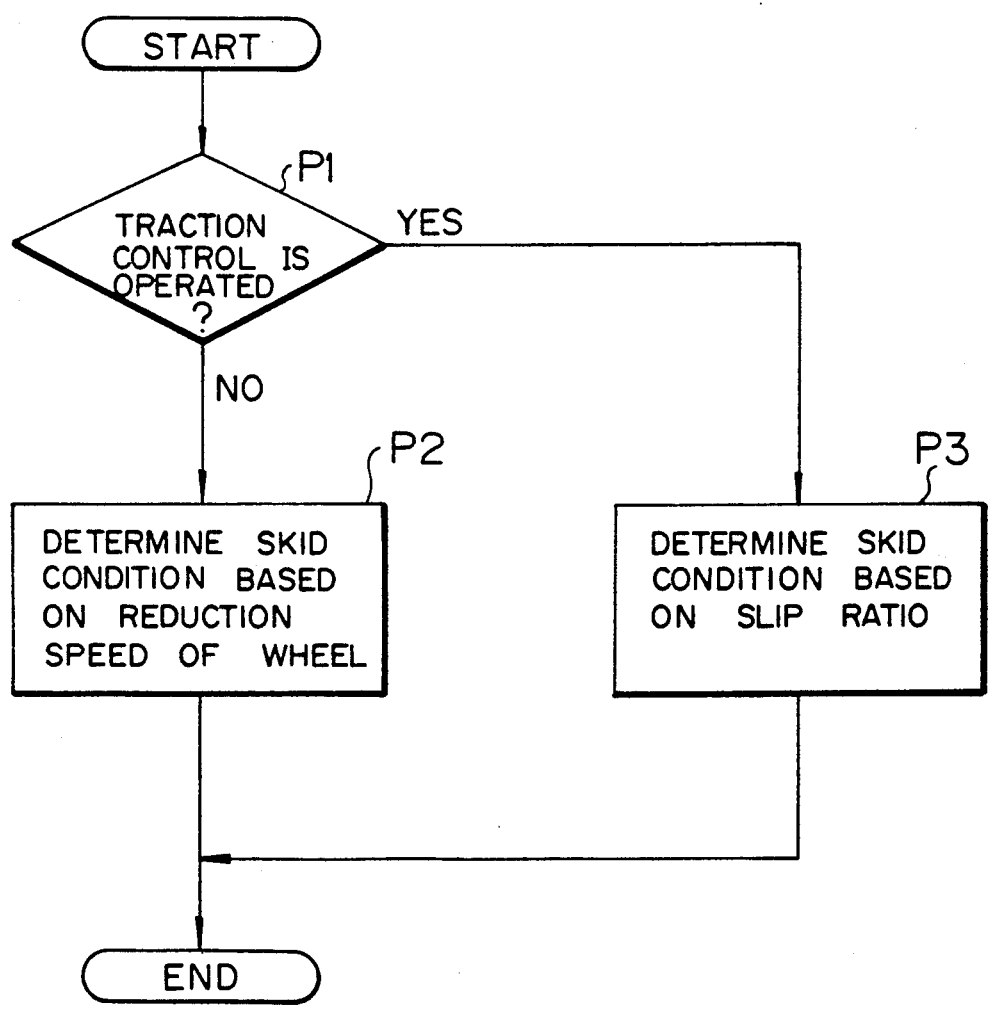
FIG. 5 is a flow chart showing a procedure of determining the skid condition of the respective wheel by the antiskid brake control system.

FIG. 5 is a flow chart showing a procedure for determining the skid condition of the respective wheel by the ABS control system.

Referring to FIG. 5, when the traction control is not operated by the traction control system, the ABS control system determines the skid condition of the respective wheel 1FR~1RL based on the reduction speed of the respective wheel 1FR~1RL (P1, P2). When the traction control is operated by the traction control system, the ABS control system determines the skid condition of the respective wheel 1FR~1RL based on the slip ratio caused in the respective wheel 1FR~1RL (P1, P3). At this time, the ABS control system obtains the slip ratio of the respective wheel 1FR~1RL based on the respective wheel rotation speed of the respective wheel 1FR~1RL and predetermined reference wheel rotation speed. The ABS control system then detects the skid condition of the respective wheel 1FR~1RL, based on the slip ratio, and further increases the brake fluid pressure in accordance with the skid condition so as to cancel the lock condition of the respective wheel 1FR~1RL.

On the other hand, the ABS control system may detect a large reduction speed of either the rear wheel 1RR or 1RL and carries out the brake control operation immediately after the traction control system controls the slip of the rear wheel 1RL to a relatively large degree by increasing the brake fluid pressure of the rear wheel 1RL more than that of another rear wheel 1RR. Then, the ABS control system, which employs right and left integrated controls of the rear wheels 1RR, 1RL, decreases the brake fluid pressure of the both rear wheels 1RR, 1RL equally, based on the reduction speed, so that the brake fluid pressure of the rear wheel 1RR, which is maintained or increased at a relatively low pressure level by the traction control operation, is decreased too much so as not to obtain the desired braking force. Therefore, in accordance with the embodiment of the invention, the ABS control system controls independently the rear right wheel 1RR and the rear left wheel 1RL transitionally during the traction control operation.

FIG. 6 is a flow chart showing a procedure for controlling the rear wheels by the ABS control system.

Referring to the FIG. 6, the ABS control system may recognize that the condition for starting the brake control operation is satisfied by the excessive reduction speed of the wheels 1FR~1RL (P11), and further recognize that the traction control operation is carried out within a predetermined time or immediately before the condition of starting the brake control operation is satisfied and that the traction control system controls the right and left rear wheels 1RR, 1RL independently (P12, P13). Then, the ABS control system changes the brake control operation in the right and left rear wheels 1RR, 1RL to the right and left independent control operation (P14). Therefore, the ABS control system controls the brake fluid pressure of the right and left rear wheels 1RR, 1RL, based on the skid conditions of the wheels, respectively, so that the brake fluid pressure of the rear wheel, having brake fluid pressure which is decreased in the relative low level in the traction control operation, is not decreased too much and the rear wheel can obtain the desired braking force.

The ABS control system maintains the right and left independent control operation for a predetermined time, and then returns back to the right and left integrated control operation (P14, P15, P16).

In the embodiment of the invention mentioned above, the ABS control system starts the right and left integrated control operation of the rear wheels 1RR, 1RL, based on the reduction speed of one rear wheel having a reduction speed which is larger than the other. However, the present invention may be applied to an ABS control system which starts the right and left integrated control operation of the rear wheels 1RR, 1RL based on the average of the reduction speeds of the rear wheels 1RR, 1RL.

In the engine control operation, the engine output may be decreased by variable control of the ignition timing and/or by cutting fuel supplied to the engine. Further, the combination of this control operation, in which the engine output is decreased by the variable control of the ignition timing and/or cutting fuel supplied to the engine and the control operation in which the engine output is decreased, based on the throttle opening described in the above embodiment, may be employed.

The control of the throttle valve may be carried out by the stepping motor instead of the throttle opening control mechanism.

The slip ratio may be employed by other definitions which correspond to the slip ratio substantially.

What is claimed is:

1. A slip control system for controlling slippage of driving wheels of a motor vehicle comprising:
   means for detecting a slip ratio of each driving wheel;
   means for detecting a reduction speed of each wheel;
   traction control means for decreasing a slip of each driving wheel by controlling brake fluid pressure in each driving wheel so that the slip ratio of each driving wheel becomes at least equal to a predetermined desired slip ratio; and
   an antiskid brake system for controlling brake fluid pressure based on the reduction speed of each wheel so as to cancel a lock condition of the wheel, and antiskid brake system including first control means for controlling the brake fluid pressure in a condition in which a traction control operation is not carried out by the traction control means, and second control means for controlling the brake fluid pressure, in a different manner from that of the first control means, in a condition in which a traction control operation is carried out by the traction control means.

2. A slip control system in accordance with claim 1, in which said first control means includes brake control means for controlling the brake fluid pressure based on a skid condition of the wheel which is determined from the reduction speed detected by the means for detecting a reduction speed, and said second control means includes brake control means for controlling the brake fluid pressure based on a skid condition of the wheel which is determined based on the slip ratio detected by the means for detecting a slip ratio.

3. A slip control system in accordance with claim 1, in which said first control means includes a first brake control means for decreasing the brake fluid pressure for the driving wheels equally, based on a skid condition of the driving wheels, and said second control means includes a second brake control means for decreasing the brake fluid pressure for the driving wheels independently, based on a skid condition of each driving wheel.

4. A slip control system in accordance with claim 3, in which said first brake control means decreases the brake fluid pressure for each of the driving wheels equally based on a driving wheel having a reduction speed which is larger than a reduction speed of the other driving wheel.

5. A slip control system in accordance with claim 3, in which said first brake control means decreases the brake fluid pressure for each of the driving wheels equally based on an average of the reduction speeds of the driving wheels.

6. A slip control system in accordance with claim 3, wherein when the traction control means controls each driving wheel independently, the second brake control means controls each driving wheel independently during a predetermined time and then the first brake control means controls the driving wheels equally.

7. A slip control system for controlling slippage of driving wheels of a motor vehicle comprising:
   means for detecting a slip ratio of each driving wheel;
   means for detecting a reduction speed of each wheel;
   traction control means for decreasing a slip of each driving wheel by controlling brake fluid pressure in each driving wheel so that the slip ratio of each driving wheel becomes at least equal to a predetermined desired slip ratio after the slip ratio of each driving wheel has become more than the desired slip ratio;
   an antiskid brake system for controlling brake fluid pressure, based on a skid condition of a wheel which is determined from the reduction speed detected by the means for detecting a reduction speed; and
   means for changing the skid condition of the wheel, based on which the antiskid brake system controls said brake fluid pressure, when a traction control operation is carried out by the traction control means.

8. A slip control system in accordance with claim 7, wherein when a traction control operation is not carried out by the traction control means, said means for changing the skid condition determines the skid condition based on the reduction speed detected by the means for detecting the reduction speed, and when a traction control operation is carried by the traction control means, said means for changing the skid condition determines the skid condition based on the slip ratio detected by the means for detecting the slip ratio.

9. A slip control system for controlling slippage of driving wheels of a motor vehicle comprising:
  means for detecting a slip ratio of each driving wheel;
  means for detecting a reduction speed of each wheel;
  traction control means for decreasing a slip of each driving wheel by controlling brake fluid pressure in each driving wheel so that the slip ratio of each driving wheel becomes at least equal to a predetermined desired slip ratio after the slip ratio of each driving wheel has become more than the desired slip ratio;
  an antiskid brake system for controlling brake fluid pressure, based on a skid condition of a wheel which is determined from the reduction speed detected by the means for detecting a reduction speed, wherein when a traction control operation is not carried out by the traction control means, a means for changing the skid condition determines the skid condition based on the reduction speed detected by the means for detecting the reduction speed, and when a traction control operation is carried out by the traction control means, said means for changing the skid condition determines the skid condition based on the slip ratio detected by the means for detecting the slip ratio.

* * * * *